J. M. BENHAM & G. W. SLATER.
TIRE.
APPLICATION FILED JUNE 19, 1909.
977,584.
Patented Dec. 6, 1910.
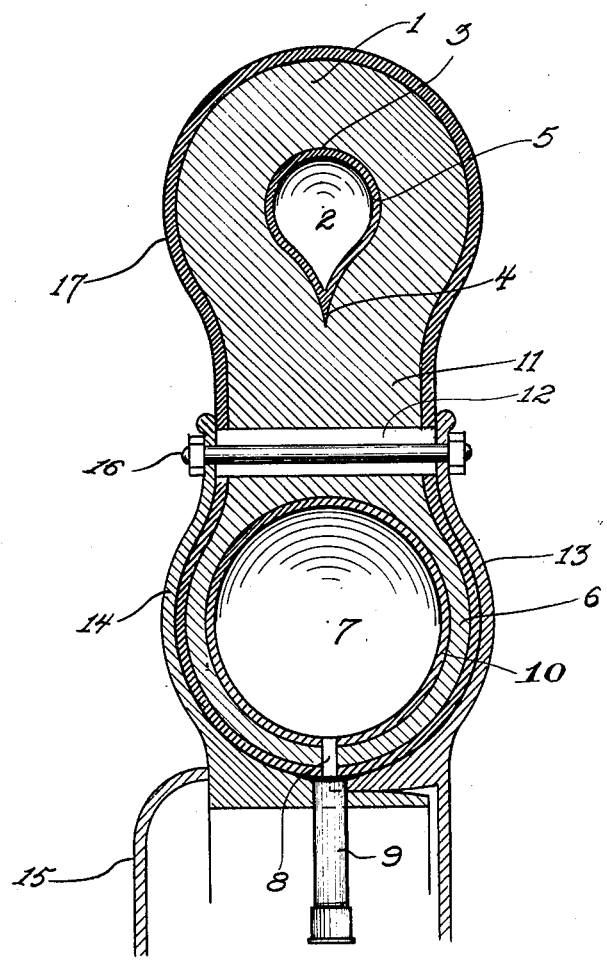
WITNESSES:
J. D. McLaughlin
Harry C. Schroeder
INVENTORS
Joseph M. Benham,
and George W. Slater,
BY
ATTORNEY.

UNITED STATES PATENT OFFICE.

JOSEPH M. BENHAM AND GEORGE W. SLATER, OF OAKLAND, CALIFORNIA.

TIRE.

977,584.   Specification of Letters Patent.   Patented Dec. 6, 1910.

Application filed June 19, 1909. Serial No. 503,157.

*To all whom it may concern:*

Be it known that we, JOSEPH M. BENHAM and GEORGE W. SLATER, citizens of the United States, residing at Oakland, in the county of Alameda and State of California, have invented certain new and useful Improvements in Tires, of which the following is a specification, reference being had therein to the accompanying drawing.
This invention relates to tires especially adapted for motor vehicles, and has especial reference to resilient tires in which the tread portion thereof is cushioned but not inflatable, and the rim engaging portion of which is inflatable, thereby providing a tire in which all the benefits of an ordinary inflatable tread tire are obtained without the objections thereto incidental to punctures and the like.
This invention has for its object to provide an improved tire of this character constructed and arranged as hereinafter set forth and claimed.

In carrying out the objects of the invention generally stated above it will, of course, be understood that the essential features thereof are necessarily susceptible to changes in details and structural arrangements, but a preferred and practical embodiment of the same is shown in the accompanying drawings, wherein the tire has been shown in central vertical section.

Referring to said drawing it will be observed that the tire is composed of an outer rounded tread portion 1 which has a central opening 2 formed therein the outer portion of which is enlarged and rounded as indicated at 3 and the inner portion of the same being reduced and converging to a narrow channel 4. A lining or tube 5 may be formed within said opening. The opening 2 extends entirely around the tire and permits the necessary contraction and expansion of the tread surface of the tire when in use as will be readily understood.

The rim engaging portion 6 of the tire is also rounded and is provided with an enlarged tubular opening 7 which extends entirely around the tire and which has a tube connection 8 with an inflating valve 9. The opening 7 may be provided with a tube or lining 10, similar to the well known inner tube tires, if desired.

The tread portion of the tire and the rim engaging portion are connected by means of a flat, elongated neck 11 which is provided with regularly spaced apart transversely extending slots 12.

The tire set forth above is well adapted for use in connection with a wheel not shown, said wheel being provided with a stationary jaw 13 and a movable jaw 14, the movable jaw being held in clamping relation with the stationary jaw by means of a housing plate 15. The outer ends of said jaws are connected by means of bolts 16 which pass through the slots 12 of the neck of the tire.

The tire as shown is incased in a textile sheathing 17, although obviously the same may be omitted if desired.

It will be seen from the foregoing that the improved tire has its inflatable portion located between and surrounded by the jaws of the wheel so that there is little or no danger of the same being punctured or otherwise damaged, although at the same time the same readily performs its cushioning functions. And through the use of the cushioned, non-inflatable, tread portion, supplemented by the play allowed the tire through its bolt and slot connection with said jaws, it will be seen that the same adds to the cushioning of the tire and at the same time provides a tread surface which is not affected by punctures or the like.

The wheel shown in the drawing and described briefly in the foregoing is not claimed in this application as the same forms the subject-matter of an application filed herewith.

What we claim as our invention is:—

A tire formed in one piece and comprising a pair of opposed substantially circular shaped portions, one portion constituting the tread and having a non-inflatable passageway extending centrally and longitudinally therethrough, the other portion adapted to be engaged by the rim and having an inflatable passageway extending medially in the direction of its length, said passageways being separated by a long neck portion and being equidistant from the peripheries of said circular portions, a lining extending entirely around, and lying contiguous, said circular portions and neck, a pair of clamping jaws surrounding the rim engaging portion and projecting to the lower extremity of said neck, said neck and lining having a transversely disposed slot, and a bolt connected to the terminals of the jaws and projecting through said slot.

In testimony whereof we hereunto affix our signatures in presence of two witnesses.

JOSEPH M. BENHAM.
GEORGE W. SLATER.

Witnesses:
H. C. SCHROEDER,
F. P. SCHROEDER.